(12) United States Patent
Wong et al.

(10) Patent No.: US 7,191,255 B2
(45) Date of Patent: Mar. 13, 2007

(54) TRANSACTION LAYER LINK DOWN HANDLING FOR PCI EXPRESS

(75) Inventors: Kar Leong Wong, Teluk Intan (MY); Mikal C. Hunsaker, El Dorado Hills, CA (US); Prasanna C. Shah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/975,132

(22) Filed: Oct. 27, 2004

(65) Prior Publication Data
US 2006/0090014 A1   Apr. 27, 2006

(51) Int. Cl.
*G06F 3/00*   (2006.01)

(52) U.S. Cl. .................. 710/5; 710/15; 710/19; 710/62; 711/2

(58) Field of Classification Search ........... 710/313, 710/314, 315, 62, 8, 15, 5, 19; 714/2
See application file for complete search history.

(56) References Cited

U.S. PATENT DOCUMENTS

| 6,629,166 B1* | 9/2003 | Grun ..................... 710/36 |
| 7,085,860 B2* | 8/2006 | Dugan et al. ............. 710/36 |
| 2005/0060470 A1* | 3/2005 | Main et al. .............. 710/305 |
| 2005/0149657 A1* | 7/2005 | Martin et al. ............ 710/302 |
| 2005/0149658 A1* | 7/2005 | Martin et al. ............ 710/302 |

OTHER PUBLICATIONS

J. Brewer, J. Sekel, PCI Express Technology, DELL Technology White Paper, DELL Inc., Feb. 2004.*
Eugin-Hyun, Kwang-Su-Seong, The effective buffer architecture for data link layer of PCI express., ITCC 2004. International Conference on Information Technology: Coding and Computing, vol. 1, Las Vegas, NV, USA, Apr. 5-7, 2004.*
"PCI Express™ Base Specification, Revision 1.0a," Apr. 15, 2003, pp. 1-426, PCI-SIG.

* cited by examiner

*Primary Examiner*—Kim Huynh
*Assistant Examiner*—Aurangzeb Hassan
(74) *Attorney, Agent, or Firm*—Blakely, Sokoloff, Taylor & Zafman LLP (57) ABSTRACT

Transaction layer link down handling for Peripheral Component Interconnect (PCI) Express. A link between an input/output (I/O) controller port of an I/O controller and a device port of a device is initialized, wherein the link includes a physical layer, a data link layer, and a transaction layer. The transaction layer is restored after a data link down condition without software intervention.

26 Claims, 8 Drawing Sheets

COMPUTER SYSTEM
100

PCI EXPRESS PACKET 250

TRANSACTION LAYER LINK DOWN HANDLING FOR PCI EXPRESS

BACKGROUND

1. Field

Embodiments of the invention relate to the field of computer systems and more specifically, but not exclusively, to transaction layer link down handling for Peripheral Component Interconnect (PCI) Express.

2. Background Information

Input/output (I/O) devices of a computer system often communicate with the system's central processing unit (CPU) and system memory via a chipset. The chipset may include a memory controller and an input/output controller. Devices of the computer system may be connected using various buses, such as a Peripheral Component Interconnect (PCI) bus.

A new generation of PCI bus, called PCI Express, has been promulgated by the PCI Special Interest Group. PCI Express uses high-speed serial signaling and allows for point-to-point communication between devices. Communications along a PCI Express connection are made using packets. Interrupts are also made using packets by using the Message Signal Interrupt scheme.

A surprise removal of a device from a PCI Express connection causes a link down condition and may result in a computer system crash. Current schemes may require software intervention or resetting of the system to clean up outstanding communications interrupted by the removal of the device. Today's systems fail to adequately handle link down situations of the PCI Express transaction layer.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
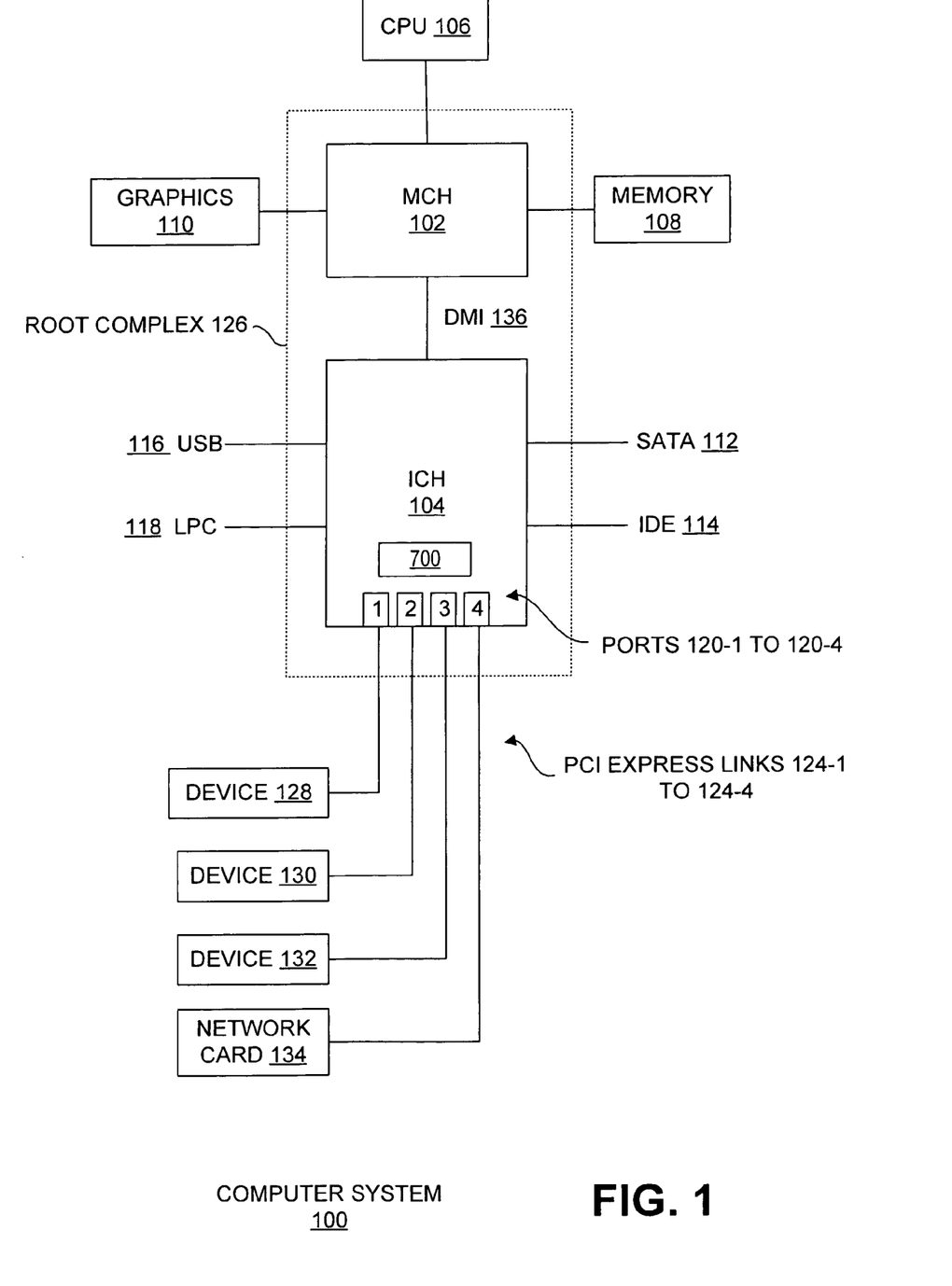
FIG. 1 is a block diagram illustrating one embodiment of an environment to support transaction layer link down handling in accordance with the teachings of the present invention.

Referring to FIG. 1, one embodiment of a computer system 100 is shown. Embodiments of computer system 100 include, but are not limited to, a desktop computer, a notebook computer, a server, a personal digital assistant, a network workstation, or the like. Computer system 100 includes an I/O controller, such as Input/Output Controller Hub (ICH) 104, coupled to a memory controller, such as Memory Controller Hub (MCH) 102. In one embodiment, ICH 104 is coupled to MCH 102 via a Direct Media Interface (DMI) 136. In one embodiment, ICH 104 includes an Intel® ICH6 family of I/O controllers.

A Central Processing Unit (CPU) 106 and memory 108 is coupled to MCH 102. CPU 106 may include, but is not limited to, an Intel Pentium®, Xeon®, or Itanium® family processor, or the like. Memory 108 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM)™, or the like. MCH 102 may also be coupled to a graphics card 110 via a PCI Express link (PCI Express discussed further below). In an alternative embodiment, MCH 102 may be coupled to an Accelerated Graphics Port (AGP) interface (not shown).

ICH 104 may include support for a Serial Advanced Technology Attachment (SATA) interface 112, an Integrated Drive Electronics (IDE) interface 114, a Universal Serial Bus (USB) 116, and a Low Pin Count (LPC) bus 118.

ICH 104 may also include PCI Express ports 120-1 to 120-4 that are substantially in compliance with the *PCI Express Base Specification Revision* 1.0a, Apr. 15, 2003. While the embodiment shown in FIG. 1 shows an I/O controller having four PCI Express ports, it will be understood that embodiments of the present invention are not limited to four PCI Express ports.

Each port 120 is coupled to an add-in device via PCI Express links 124. In the embodiment of FIG. 1, port 120-1 is coupled to add-in device 128 by PCI Express Link 124-1, port 120-2 is coupled to add-in device 130 by PCI Express link 124-2, port 120-3 is coupled to add-in device 132 by PCI Express link 124-3, and port 120-4 is coupled to a network card 134 by PCI Express link 124-4. In one embodiment, network card 134 includes an Ethernet Gigabyte card. Embodiments of an Add-in card include optical disk drive connectors, magnetic disk drive connectors, sound cards, modems, or the like.

Alternative embodiments of computer system 100 may include other PCI Express port configurations. In one embodiment, at least one port 120 connects to a switch that may provide additional PCI Express ports.

PCI Express architecture may include a root complex 126. Root complex 126 connects CPU 106 and memory 108 to the computer system input/output. Devices 128–134 make up endpoints of the PCI Express topology. Endpoints may initiate transactions as requesters, or respond to transactions as completers.

PCI Express architecture may also use the terms "upstream" and "downstream." An upstream transaction is traffic sent towards the root complex, while a downstream transaction is traffic moving away from the root complex. For example, from the point of view of ICH 104, ICH 104 sends downstream transactions to devices 128–134 and receives upstream transactions from devices 128–134.

Figure 2A:
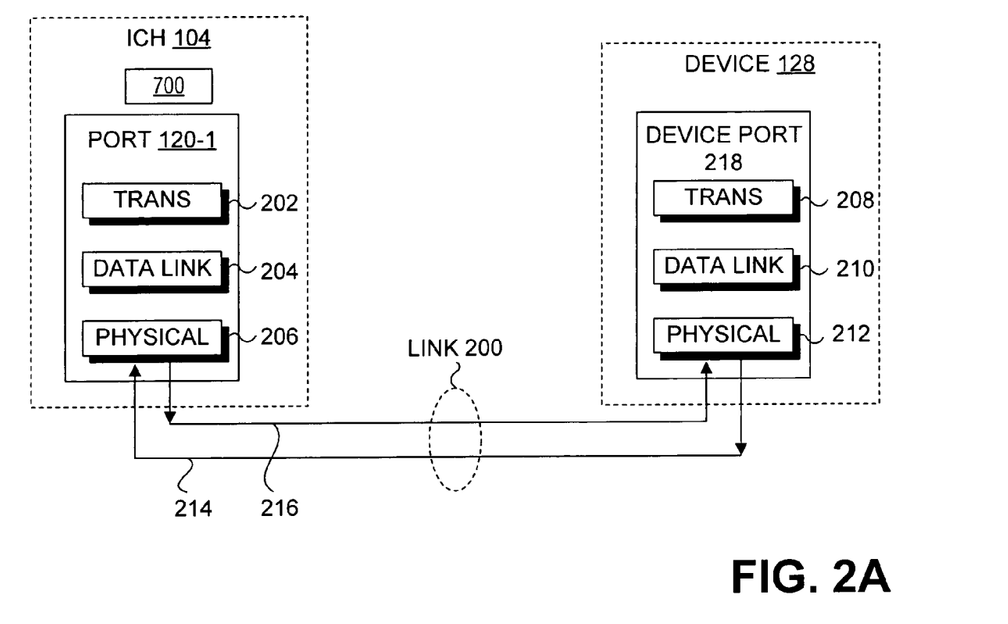
FIG. 2A is a block diagram illustrating one embodiment of an environment to support transaction layer link down handling in accordance with the teachings of the present invention.

FIG. 2A shows ICH 104 coupled to device 128 via PCI Express Link 200. Link 200 is a connection between port 120-1 of ICH 104 and a device port 218 of device 128. Link 200 includes a differential signal pair consisting of a receive pair 214 and a transmit pair 216 from the perspective of ICH 104.

Link 200 supports at least 1 lane. Each lane represents a set of differential signaling pairs, one pair for transmitting and one pair for receiving resulting in a total of 4 signals. A x1 link includes 1 lane. The width of link 200 may be aggregated using multiple lanes to increase the bandwidth of the connection between ICH 104 and device 128. In one embodiment, link 200 may include a x1, x2, and x4 link. Thus, a x4 link includes 4 lanes. In other embodiments, link 200 may provide up to a x32 link. In one embodiment, a lane in one direction has a rate of 2.5 Gigabits per second.

FIG. 2A also shows the logic layers of an embodiment of the PCI Express architecture. ICH 104 includes a Transaction Layer 202, a Data Link Layer 204, and a Physical Layer 206. Device 128 includes a corresponding Transaction Layer 208, Data Link Layer 210, and Physical Layer 212.

Figure 2B:
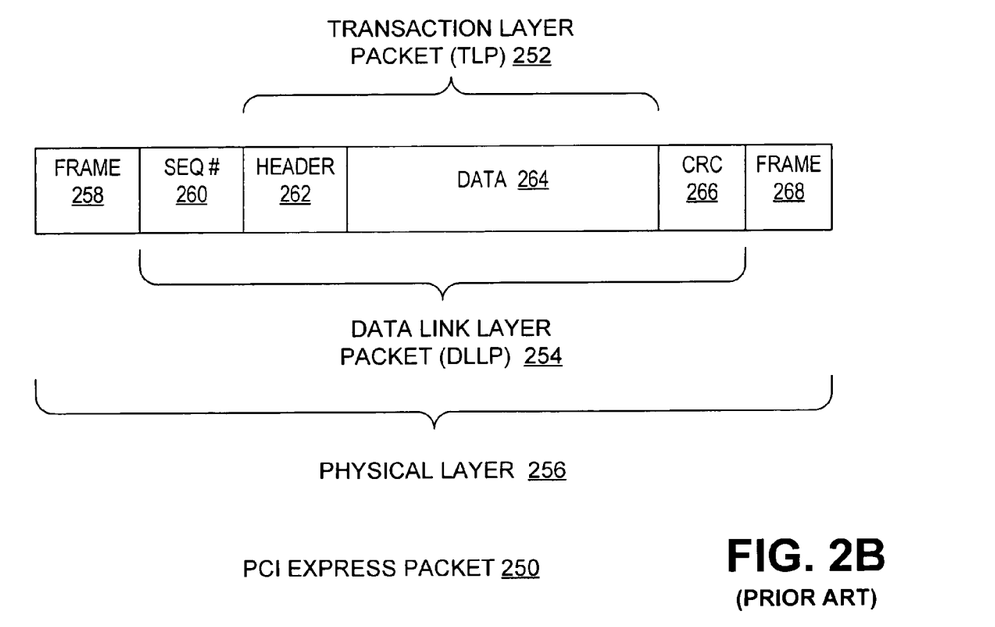
FIG. 2B is a block diagram illustrating one embodiment of an environment to support transaction layer link down handling in accordance with the teachings of the present invention.

Information between devices is communicated using packets. FIG. 2B shows an embodiment of PCI Express packet 250. To send a packet, the packet is started at the Transaction Layer and passed down to the Physical Layer. The packet is received at the Physical Layer of the receiving device and passed up to the Transaction Layer. The packet data is extracted from the packet at the receiving device.

In general, the Transaction Layer assembles and disassembles Transaction Layer Packets (TLPs), such as TLP 252. TLP 252 includes a header 262 and data 264. TLPs may be used to communicate read and write transactions. TLPs may also include command functions, such as an interrupt.

The Data Link Layer serves as an intermediate stage between the Transaction Layer and the Physical Layer. The Data Link Layer may perform link management and data integrity verification. The Data Link Layer creates a Data Link Layer Packet (DLLP) 254 by adding a sequence number 260 and a Cyclic Redundancy Check (CRC) 266 for transmission. On the receive side, the Data Link Layer checks the integrity of packet 250 using CRC 266. If the receiving Data Link Layer detects an error, the Data Link Layer may request that the packet be re-transmitted.

The Physical Layer takes information from the Data Link Layer and transmits a packet across the PCI Express link. The Physical Layer adds packet framing 258 and 268 to indicate the start and end of packet 250. The Physical Layer may include drives, buffers, and other circuitry to interface packet 250 with link 200.

Figure 3:
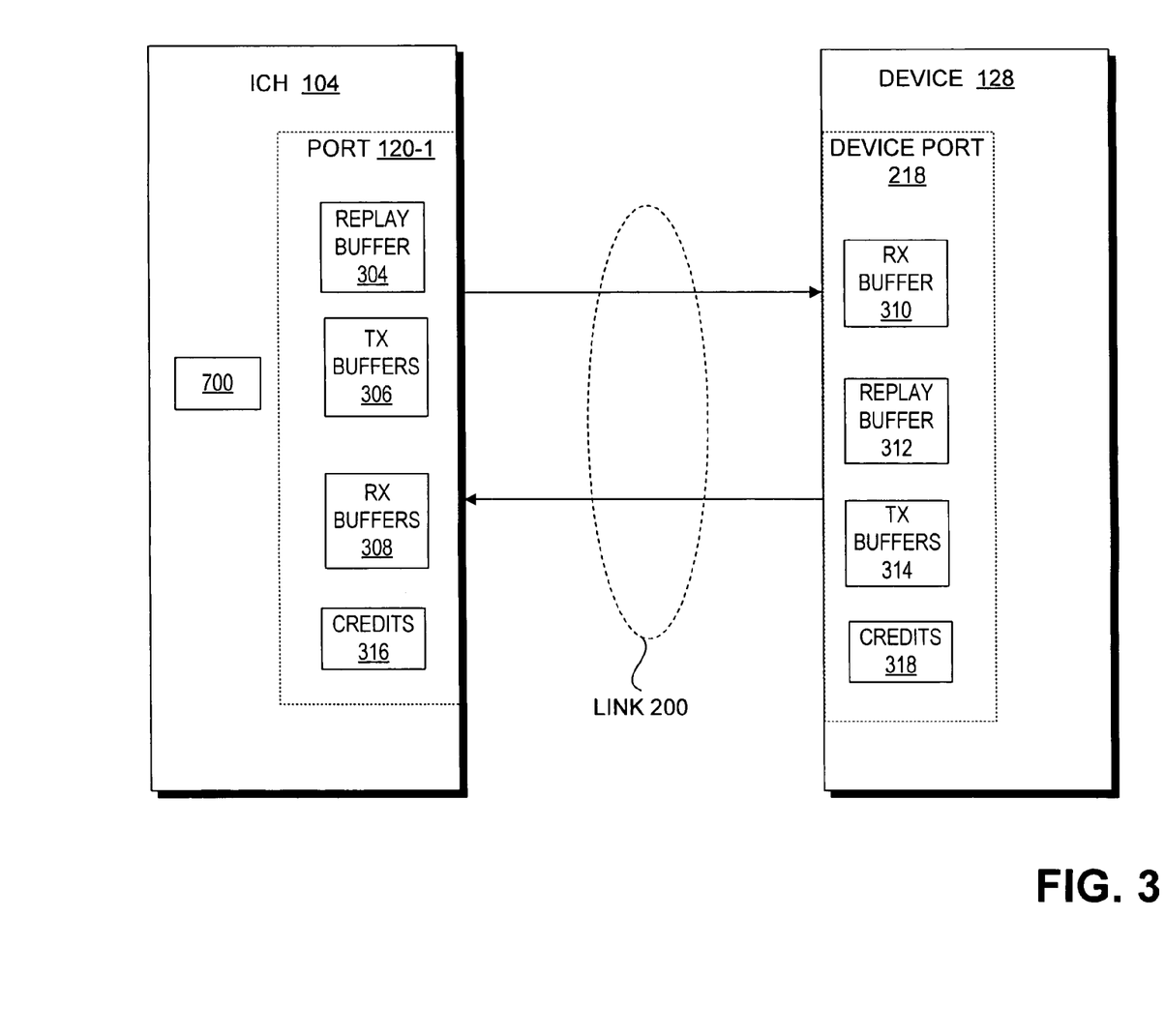
FIG. 3 is a block diagram illustrating one embodiment of an environment to support transaction layer link down handling in accordance with the teachings of the present invention.

Turning to FIG. 3, an embodiment of buffers associated with port 120-1 and a device port 218 of device 128 are shown. ICH 104 is coupled to device 128 via link 200. The transmit side of port 120-1 has associated Replay buffer 304 and Transmit (TX) buffers 306. The receive side of port 120-1 has associated Receive (RX) buffers 308.

Device port 218 has associated Receive buffers 310 as well as Replay buffer 312 and Transmit buffers 314.

PCI Express uses a credit-based flow control. In general, credits at the Transaction Layer are used to indicate if the Receive buffers at the other end of the link are able to hold more TLPs. In the embodiment of FIG. 3, port 120-1 includes credits 316 and device port 218 includes credits 318. For example, if port 120-1 is ready to send a TLP to device port 218, port 120-1 checks credits 316 to determine if it has used the available credits of device port 218. If there are available credits, then port 120-1 knows device port 218 has buffer space to receive the TLP. If there are not available credits, then port 120-1 will not send the TLP. Once device port 218 updates credits 316 showing it has open buffer space to receive a TLP, then port 120-1 will send the TLP to device port 218. Credits 318 operates in substantially the same way for device port 218. The concept of credits will be discussed in further detail below.

In one embodiment of the present invention, the link may include virtual channels. In short, numerous independent communications sessions may occur in a single lane through virtual channels. Traffic Class labeling is used to differentiate packets from among the virtual channels. For example, in an alternative embodiment of FIG. 3, port 120-1 may support Virtual Channels (VCs) 1 to N. VCs 1-N are used to communicate with corresponding devices 1 to N. Transmit buffers 306 may include Transmit buffer VC(1) to Transmit buffer VC(N). Port 120-1 has associated a single Replay buffer 304. Receive buffers 308 may include Receive buffer VC(1) to Receive buffer VC(N). Each VC Transmit and VC Receive buffers may include Posted, Non-Posted, and Completions buffers as described below in conjunction with FIG. 4A.

Figure 4A:
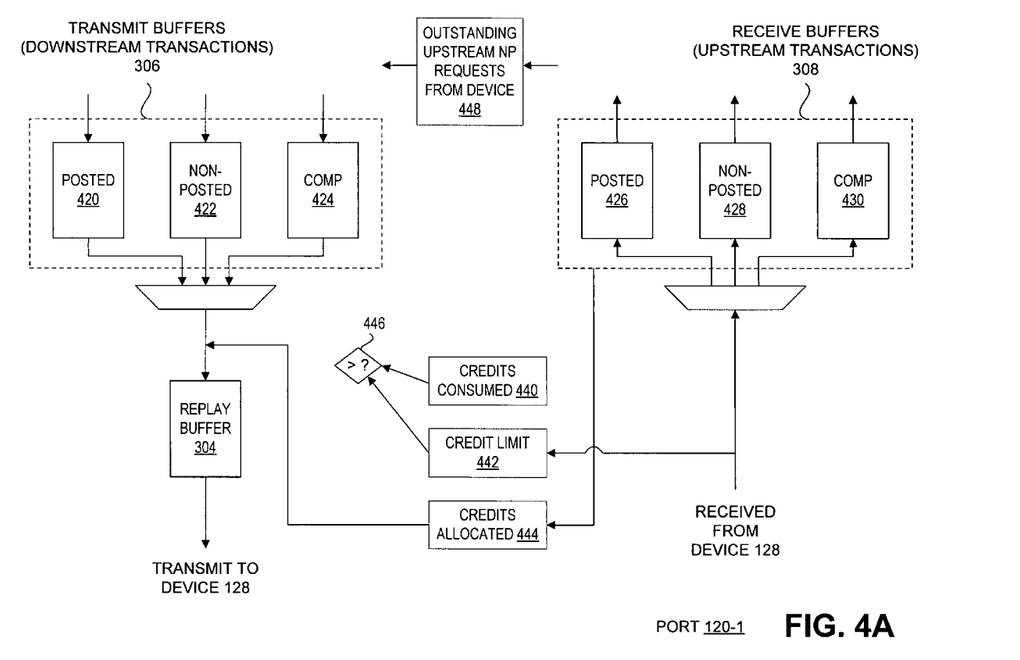
FIG. 4A is a block diagram illustrating one embodiment of an environment to support transaction layer link down handling in accordance with the teachings of the present invention.

Turning to FIG. 4A, embodiments of Transmit buffers 306, Replay buffer 304, and Receive buffers 308 associated with port 120-1 are shown. In general, Transmit buffers 306 are used to hold Transaction Layer Packets that are to be transmitted by ICH 104 to device 128, while Receive buffers 308 hold TLPs that have been received from device 128.

Transmit buffers 306 include Posted buffer 420, Non-Posted (NP) buffer 422, and Completions buffer 424. Posted buffer 420 holds TLPs that do not require a reply from the receiver, such as a write transaction. Non-Posted buffer 422 holds TLPs that may require a reply from the receiver, such as a read request.

Completions buffer 424 holds TLPs that are to be transmitted to device 128 in response to Non-Posted requests received from device 128. For example, ICH 104 may receive a read request (Non-Posted request) from device 128. The requested information is retrieved from memory and provided to ICH 104. The retrieved information is formed into one or more TLPs that may be placed in Completions buffer 424 awaiting transmission to device 128.

Replay buffer 304 is used to maintain a copy of all transmitted TLPs until the receiving device acknowledges reception of the TLP. Once the TLP has been successfully received, that TLP may be removed from the Replay buffer 304 to make room for additional TLPs. If an error occurs, then the TLP may be re-transmitted from Replay buffer 304.

Receive buffers 308 include Posted buffer 426, Non-Posted buffer 428, and Completions buffer 430. Receive buffers 308 store the received TLPs until the receiving device is ready to act on the received packets.

As shown in FIG. 4A, Transmit buffers 306 at port 120-1 receive downstream transactions. These transactions include TLPs being sent away from the Root Complex 126. Conversely, Receive buffers 308 hold TLPs that are considered upstream transactions because these transactions are moving toward Root Complex 126.

FIG. 4A also shows one embodiment of a credit scheme for port 120-1. Port 120-1 includes Credits Consumed 440, Credit Limit 442, and Credits Allocated 444. Credit Limit 442 indicates the maximum number of credits at device port 218. Credits Consumed 440 indicates the number of credits of device port 218 used by port 120-1 in transmitting packets to device 128. In one embodiment, Credit Limit 442, Credits Consumed 440, and Credits Allocated 444 are stored in registers of ICH 104. In another embodiment, each port 120 has allocated dedicated storage units for each port's own Credit Limit 442, Credits Consumed 440, and Credits Allocated 444.

Before a packet is transmitted, Credit Limit 442 is compared to Credits Consumed 440 as shown at a decision block 446. If Credit Limit 442 is greater than Credits Consumed 440, then the packet may be transmitted to device 128. If Credit Limit 442 is not greater than Credits Consumed 440, then the packet is not transmitted.

Credit Limit 442 may be updated by device port 218 through credit information transmitted over the link. Device port 218 may update Credit Limit 442 after space is opened up at the Receive buffers of device port 218.

In one embodiment, device port 218 sends an updated Credit Limit 442 value to port 120-1 and this update Credit Limit 442 replaces the previous value of Credit Limit 442. This updated value is an increment of the old Credit Limit, the increment corresponding to the amount of Receive buffer space opened up at device port 218. Correspondingly, Credits Consumed 440 is incremented when credits are used by port 120-1. However, since the availability of Receiver buffer space at device port 218 is made by a comparison at decision block 446, the actual value of Credit Limit 442 and Credits Consumed 440 is not controlling.

Credits Allocated 444 tracks the availability of space in Receive buffer 308. Thus, when a TLP is moved out of Receive buffer 308, then more credits may be allocated to the transmit side of device 128. Credits Allocated 444 is sent to device port 218 along link 200.

Figure 4B:
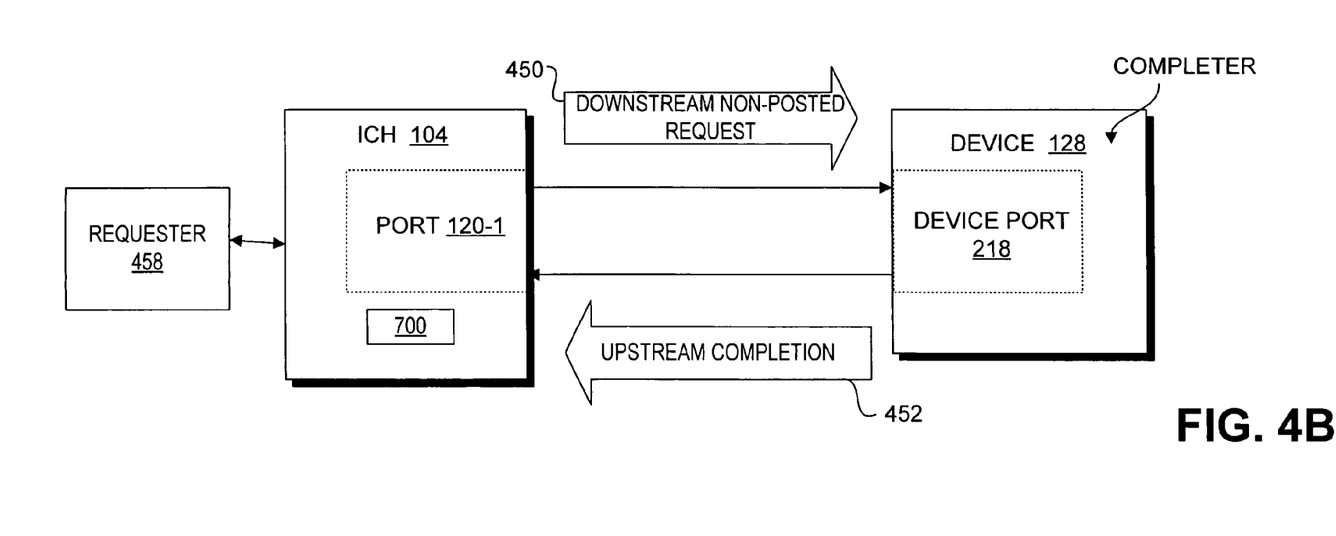
FIG. 4B is a block diagram illustrating one embodiment of an environment to support transaction layer link down handling in accordance with the teachings of the present invention.
Figure 4C:
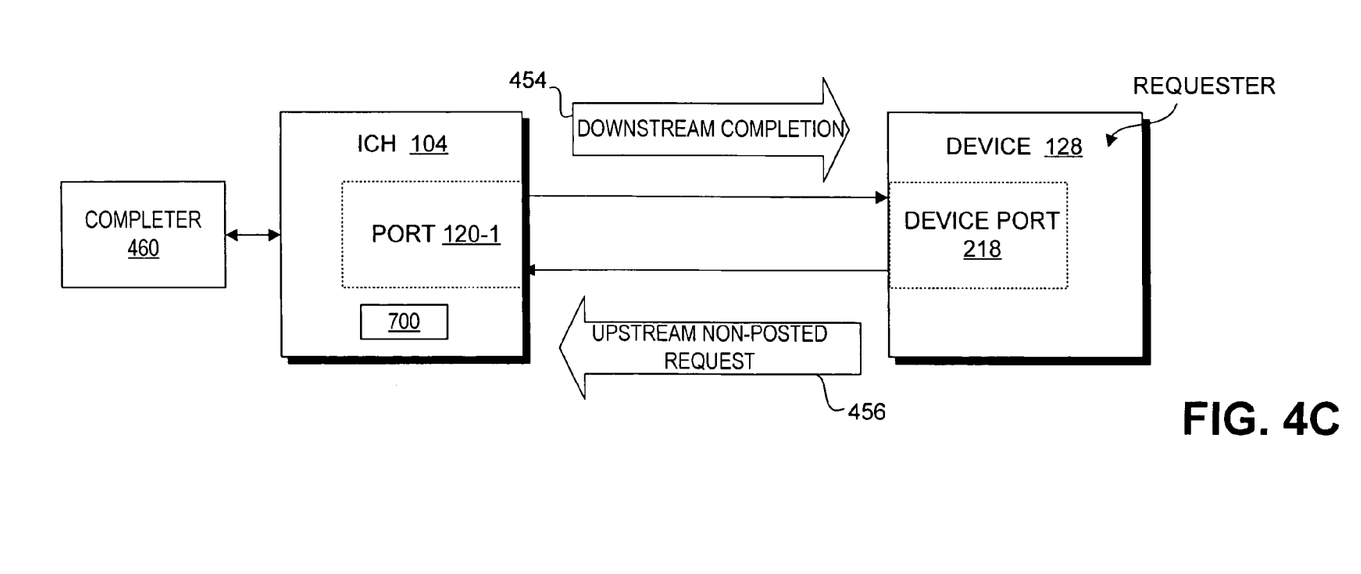
FIG. 4C is a block diagram illustrating one embodiment of an environment to support transaction layer link down handling in accordance with the teachings of the present invention.

Referring to FIGS. 4B and 4C, embodiments of transactions between ICH 104 and device 128 are shown. In FIG. 4B, a Requester 458 issues a Non-Posted request address to device 128. In one embodiment, Requester 458 includes CPU 106 requesting to read information from device 128. Port 120-1 sends a Downstream Non-Posted Request 450 to device port 218. In FIG. 4B, device 128 is considered a Completer because device 128 will complete request 450. The requested information is formed into one or more TLPs and sent from device port 218 to port 120-1 as Upstream Completion 452. ICH 104 then forwards the TLP data to Requester 458.

In FIG. 4C, Device 128 is now a Requester and sends an Upstream Non-Posted Request 456 to port 120-1. ICH 104 forwards the request to Completer 460. In one embodiment, Completer 460 includes memory 108. The requested information is sent to ICH 104 and formed into one or more TLPs. The TLP(s) are sent from port 120-1 to device port 218 as a Downstream Completion 454.

Referring again to FIG. 4A, an Outstanding Upstream Non-Posted (NP) Requests Queue 448 tracks outstanding upstream Non-Posted requests (for example, read requests) received at ICH 104 from device 128. Queue 448 allows port 120-1 to be aware of NP requests that have not been fulfilled by the transmission of a Completion transaction from port 120-1 to device port 218.

For example, device 128 makes a read request to memory 108. ICH receives the read request and notes an outstanding upstream NP request in queue 448. Once the Completion having the requested information from memory has been successfully transmitted from port 120-1 to device port 218, then this outstanding upstream NP request may be removed from queue 448.

However, in another example, assume device 128 is removed from computer system 100 creating a link down state before port 120-1 can send the Completion. Port 120-1's knowledge of this outstanding upstream NP request prevents port 120-1 from sending the Completion to a second device put in device 128's former position. Queue 448 is used in preventing unexpected Completion errors.

In general, an unexpected Completion error may occur when a Completion intended for an old device is erroneously sent to a new device that has replaced the old device. Such a situation may be referred to as an "unexpected Completion error" because the new device receives a Completion packet without having made the initial NP request. Sending a Completion intended for a previous device to a new device may cause a critical system failure. Handling of outstanding NP requests will be discussed further below in conjunction with FIG. 7.

Figure 5:
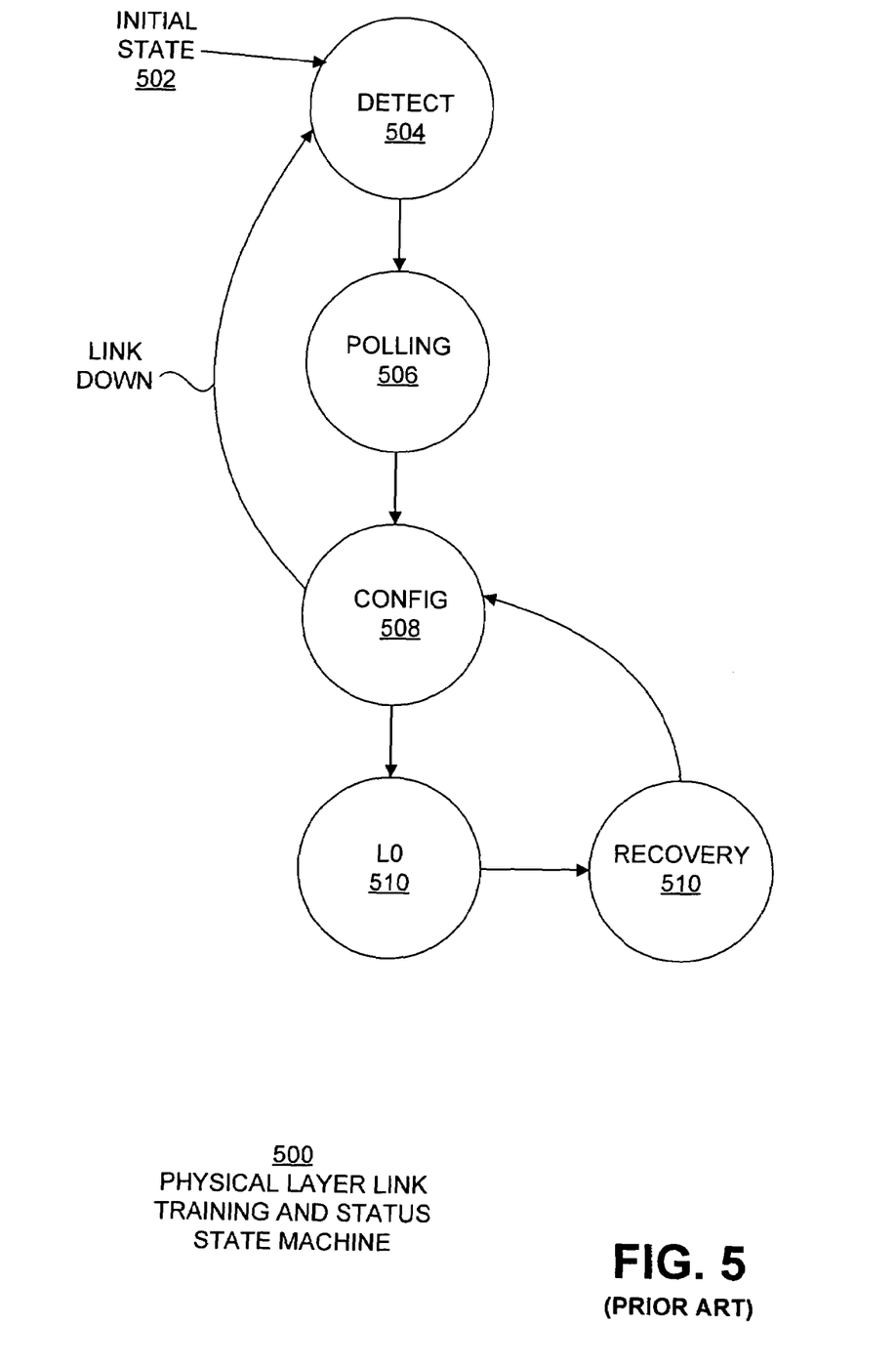
FIG. 5 is a state machine diagram illustrating one embodiment of logic and operations to support transaction layer link down handling in accordance with the teachings of the present invention.
Figure 6:
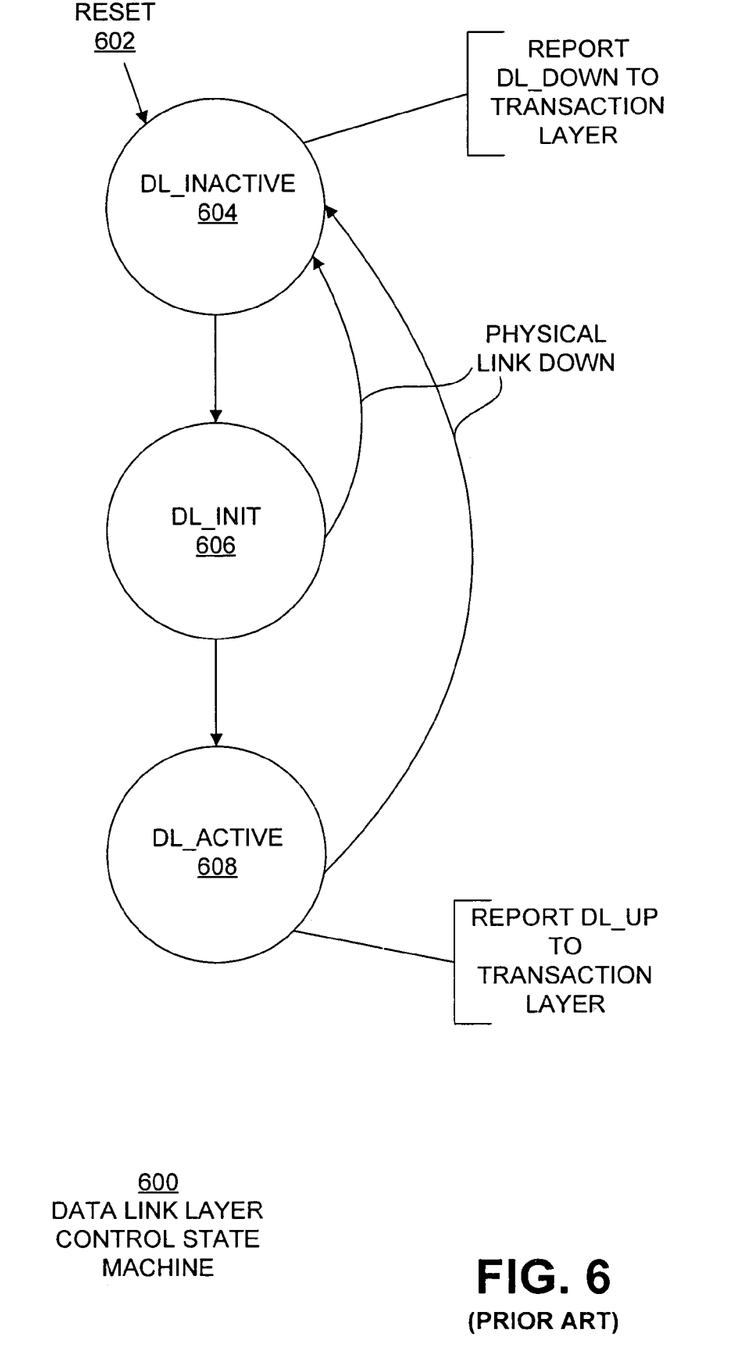
FIG. 6 is a state machine diagram illustrating one embodiment of logic and operations to support transaction layer link down handling in accordance with the teachings of the present invention.
Figure 7:
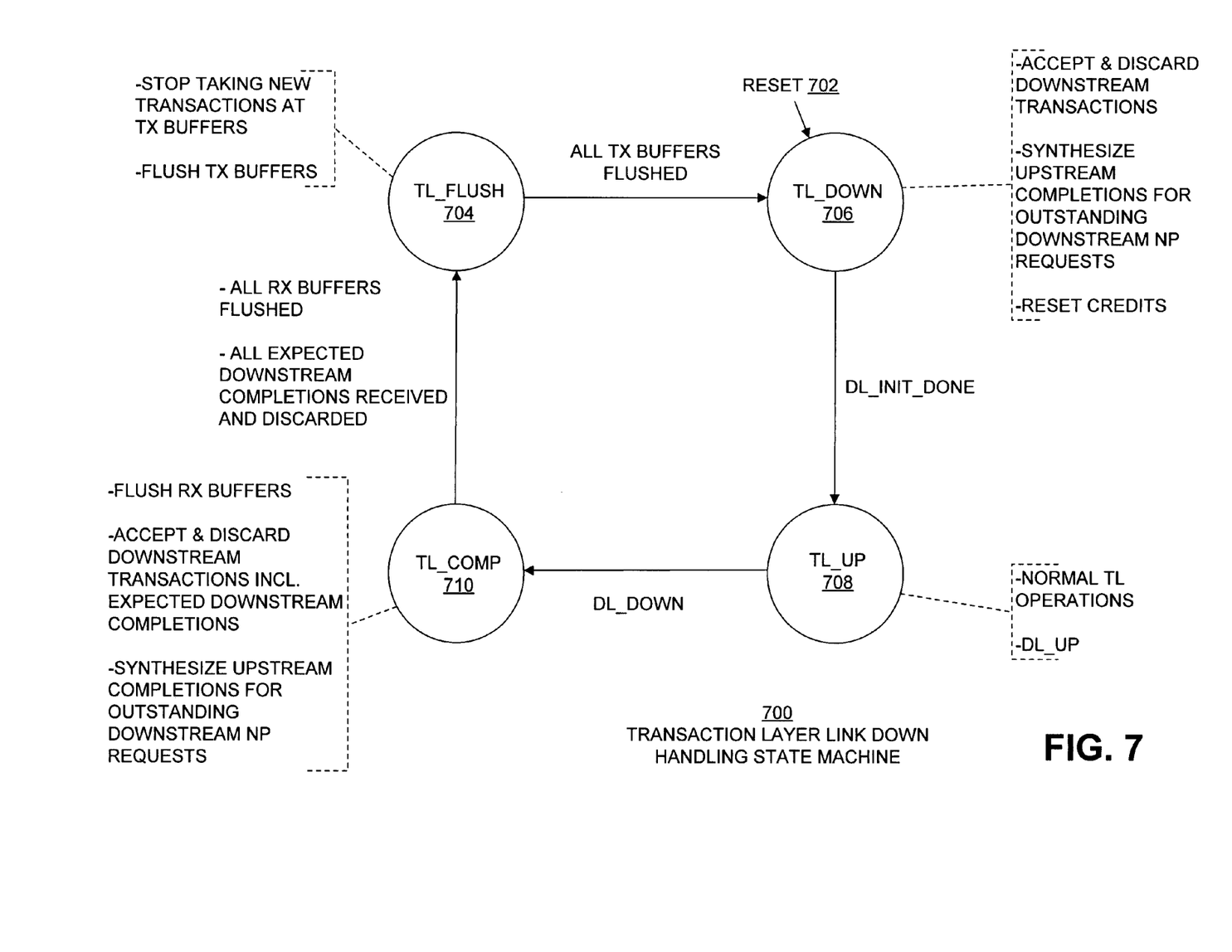
FIG. 7 is a state machine diagram illustrating one embodiment of logic and operations to support transaction layer link down handling in accordance with the teachings of the present invention.

Turning to FIGS. 5–7, embodiments of state machines to support handling a Transaction Layer link down will now be discussed. In one embodiment, the state machines may be implemented as hardware gates and other circuitry of ICH 104, such that the operations of the state machines do not need support from software executing on the computer system. In another embodiment, each port 120-1 to 120-4 is associated with its own set of state machines as described in FIGS. 5–7. Embodiments described herein allow for a Transaction Layer link down to be returned to an initial condition without software intervention after a Data Link down condition occurs.

Turning to FIG. 5, an embodiment of a Physical Layer link training and status state machine 500 is shown. State machine 500 relates to the Physical Layer of the PCI Express protocol. One skilled in the art will recognize that various power management states may occur at the Physical Layer, but these are not discussed herein for the sake of clarity.

State machine 500 is entered from an initial state 502, such as a power on of ICH 104. At a DETECT state 504, the presence of a device at the other end of the link is determined. State machine 500 transitions to a POLLING state 506 if a device is detected on the other end of the link on any lane of the link.

During POLLING 506, training sequence ordered sets are sent and received. Other events that may occur during POLLING 506 include lane polarity configuration and establishment of lane data rate.

After successful completion of POLLING 506, state machine 500 transitions to a Configuration (CONFIG) state 508. At CONFIG 508, the lane(s) of the link conduct a width and lane negotiation sequence. Other link initialization and configuration sequences are completed. If events of CONFIG 508 may not be completed, then state machine 500 transitions back to DETECT 504.

Once Configuration state 508 is successfully completed, the state machine enters an L0 state 510. L0 510 is the normal operating state where packets may be transmitted and received over the link. During L0 510, the Physical Layer reports to the Data Link layer that the physical link is up.

If an error occurs during L0 510, then the state machine transitions to a RECOVERY state 510. During RECOVERY 510, the ports attempt to perform retraining of the link in order to correct the error.

If the error is not corrected at RECOVERY 510, then the state machine transitions back to CONFIG 508. If CONFIG 508 is successful, then the state machine transitions to L0 510 for normal operations.

If CONFIG 508 is not successful, then the state machine transitions back to DETECT 504 to attempt to re-establish the link. A transition from CONFIG 508 to DETECT 504 is a link down situation.

Turning to FIG. 6, an embodiment of a Data Link Layer control state machine 600 is shown. The Data Link Layer tracks the state of the link. The DL layer communicates the status of the link to the Transaction Layer.

State machine 600 may be entered from a reset 602 of ICH 104. At Data Link Inactive (DL_INACTIVE) 604, the link is inactive or nothing is connected to the port. A Data Link Down (DL_DOWN) status is reported to the Transaction Layer. DLLPs are not generated nor accepted during DL_INACTIVE 604.

State machine 600 may transition to a DL Initialization (DL_INIT) state 606 if the Physical Layer reports the physical link is up, and the link is not disabled by software. At DL_INIT 606, initial credits are exchanged between the ports. Further handshaking is completed between the ports.

State machine 600 transitions to a DL Active (DL_ACTIVE) state 608 if initialization is successfully completed and the Physical Layer continues to report the link is up. A transition back to DL_INACTIVE 604 may occur if the Physical Layer reports the link is down.

DL_ACTIVE state 608 is the normal operating state for the Data Link Layer. While in DL_ACTIVE 608, PCI Express packets are communicated across the link. A Data Link Up (DL_UP) status is reported by the DL Layer to the Transaction Layer. State machine 600 transitions to DL_INACTIVE 604 if the Physical Layer reports the link is down.

Turning to FIG. 7, an embodiment of a Transaction Layer link down handling state machine 700 is shown. State machine 700 may return the Transaction Layer to an initial condition after DL_DOWN without software intervention or resetting of the computer system. In one embodiment, the Transmit buffers are flushed and the Receive buffers are flushed. Embodiments of state machine 700 also resolve outstanding downstream Non-Posted requests and outstanding upstream Non-Posted requests.

Starting at reset 702, the state machine enters the Transaction Layer Down (TL_DOWN) state 706. In one embodiment, reset 702 includes a reset of the computer system, such as a power-up. State machine 700 remains at TL_DOWN 706 as the Data Link is initialized by state machine 600. Once the Data Link Initialization is completed, shown as DL_INIT_DONE in FIG. 7, state machine 700 transitions to a Transaction Layer Up (TL_UP) state 708.

TL_UP 708 is the normal active state of the Transaction Layer. Transaction Layer operations proceed as normal to process TLPs. During TL_UP 708, the Data Link Layer is reporting DL_UP to the Transaction Layer.

State machine 700 exits TL_UP 708 if a DL_DOWN status is reported by the Data Link Layer. DL_DOWN indicates that there is no connection with another component on the link or that the connection with the other component has been lost and is not recoverable by the Physical or Data Link Layers.

In one embodiment, DL_DOWN may occur if a surprise removal of a device occurs. Surprise removal includes situations where a user has not notified the computer system, such as through an operating system, that the user is about to remove an add-in card.

In another embodiment, DL_DOWN may occur due to a software initiated link down condition, such as a software reset of the link. In yet another embodiment, communications along the link are so confused that the link is taken down by the Physical Layer and/or Data Link Layer in order to re-initialize the link.

At DL_DOWN, the state machine transitions to a Transaction Layer Completion (TL_COMP) state 710. One of the goals of TL_COMP 710 is to flush the contents of the Receive buffers. The contents of Replay buffer are also discarded.

Downstream transactions are continued to be accepted into the Transmit buffers as if in TL_UP. These transactions are moved into the Replay buffer as if in a TL_UP state. However, the Replay buffer is in a reset mode, so the TLPs are simply discarded and not placed in the Replay buffer. Thus, the contents of the Transmit buffers are flushed.

Infinite credits available at the device are advertised to the Transmit side of the ICH port. In this way, the Transmit buffers of the ICH port may be flushed without waiting for more credits from the device. Referring back to FIG. 4A, assume link 200 between ICH 104 and device 128 is down. In order to more efficiently flush Transmit buffers 306, Credit Limit 442 is advertised as infinite. Thus, when the comparison of decision block 446 is performed, port 120-1 always believes the Receive buffers at device port 218 have room to receive TLPs. This advertising of infinite credits at device 128 fakes out the Transaction Layer of port 120-1 to allow continuous flushing of the Transmit buffers 306 without waiting for more credits from device port 218.

It will be noted that the Transmit buffers are not flushed by using a strict "Flush" command, or the like. The Transmit buffers are being effectively flushed by allowing them to move their TLPs, per normal operation, to a Replay buffer that is in reset. Enqueuing TLPs from the Transmit buffers 306 through normal procedures may ease compatibility with an ICH backbone protocol of ICH 104.

The Receive buffers are allowed to process as normally and forward their TLPs.

If the ICH has sent any downstream NP requests before DL_DOWN occurred, then Completions are artificially synthesized and sent back to the requesters, such as the CPU. Since the link is down, port 120-1 does not expect to receive a Completion from device port 218. In one embodiment, the synthesized ("fake") Completion may include an error bit. The error bit will cause the requester to not use the synthesized Completion and discard it. Sending a synthesized Completion to requester may prevent a requester from becoming hung while it waits for a Completion from a device that has been removed from the system.

Referring again to FIG. 4A, Outstanding Upstream NP Requests 448 is used to track all expected downstream Completions at the Transmit buffers that have been received and discarded. Thus, unexpected completions errors are avoided because Completions that are intended for the old device will not be mistakenly sent to a new device in the slot previously occupied by the old device.

State machine 700 stays in TL_COMP 710 until all upstream Transaction Layer transactions at the Receive buffers have been flushed and all expected downstream Completions at the Transmit buffers have been received and discarded.

Upon exit of TL_COMP 710, state machine 700 transitions to the Transaction Layer Flush (TL_FLUSH) state 704. In one embodiment, the goal of TL_FLUSH 704 is to flush out the Transmit buffers. It will be noted that when the link is down, new TLPs will not be received at the Receive buffers of the ICH. However, even though the link is down, the Transmit buffers may be receiving new TLPs addressed to the device.

During TL_FLUSH 704, the Transmit buffers temporarily stop taking new TLPs. The Transmit buffers flush by sending TLPs to the Replay buffer in reset and infinite credits are advertised, as discussed above. Thus, the Transmit buffers become completely empty. TL_FLUSH 704 exits to TL_DOWN 706 once all the Transmit buffers are empty. As discussed above, the Receive buffers were completely flushed at TL_COMP 710.

During TL_DOWN 706, link initialization at the Data Link Layer, as shown in state machine 600, is allowed to start. All downstream transactions will continue to be received at the Transmit buffers. Posted transactions and Completions will be discarded through the Replay buffer as discussed above. Non-Posted requests will be discarded and synthesized Completions will be returned to the requesters, as discussed above. TL_DOWN 706 is exited once initialization of the Data Link Layer has been successfully completed.

In one embodiment, during TL_DOWN 706, all Credits Consumed, Credits Allocated and Credits Limits registers, as well as interrupts, are synchronously reset. In another embodiment, ICH configuration registers are not synchronously reset during DL_DOWN between TL_UP 708 and TL_COMP 710.

In another embodiment, during TL_DOWN 706, Transmit Transaction Layer storage tracking logic is forced to an empty condition. The Transmit Transaction Layer storage tracking may include pointers to one or more queues that make up the Transmit buffers. Forcing the queues to empty may include resetting the pointers to an initial state. In this particular embodiment, Receive Transaction Layer storage tracking logic may not need to force an empty condition since it is already empty (in starting up condition) or has been emptied in TL_COMP 710. The Receive Transaction Layer storage tracking may include pointers to one or more queues that make up the Receive buffers.

Embodiments as described herein provide for handling Transaction Layer link down occurrences. An I/O controller, such as an ICH, may manage a surprise link down condition, such as when a device is suddenly removed from its slot. Embodiments herein allow for graceful recovery of the Transaction Layer to an initial condition after a Data Link down occurs. The Transaction Layer is returned to its initial condition without assistance from software or a system reset.

Embodiments herein also prevent unexpected Completion errors if an old device is replaced with a new device. Outstanding upstream Non-Posted requests requiring Completions are tracked at the ICH ports. This tracking ensures that the Completions are flushed before the link is trained to a new device.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description.

The terms used in the following claims should not be construed to limit the invention to the specific embodiments disclosed in the specification. Rather, the following claims are to be construed in accordance with established doctrines of claim interpretation.

What is claimed is:

1. A method, comprising:
   initializing a link between an input/output (I/O) controller port of an I/O controller and a device port of a device, wherein the link includes a physical layer, a data link layer, and a transaction layer; and
   restoring the transaction layer after a data link down condition, wherein restoring the transaction layer includes synthesizing a completion at the I/O controller and sending the synthesized completion to a requester coupled to the I/O controller, the synthesized completion sent in response to a request for the device received at the I/O controller port from the requester that cannot be completed due to the data link down condition.

2. The method of claim 1 wherein the link is substantially in compliance with a Peripheral Component Interconnect (PCI) Express specification.

3. The method of claim 1 wherein restoring the transaction layer comprises:
   flushing receive buffers associated with the I/O controller port; and
   flushing transmit buffers associated with the I/O controller port.

4. The method of claim 3 wherein restoring the transaction layer comprises discarding downstream transactions received at the I/O controller port, the downstream transactions intended for the device.

5. The method of claim 4 wherein discarding the downstream transactions includes discarding an expected downstream completion received at the I/O controller port, wherein the expected downstream completion includes a completed transaction sent from a completer to the device, the completer coupled to the I/O controller, the completer sending the expected downstream completion to the device in response to a request sent from the device before the data link down condition.

6. The method of claim 1 wherein the synthesized completion includes an error indicia.

7. The method of claim 3, further comprising resetting at least one register associated with the I/O controller port, wherein the at least one register stores credits used to track available receive buffer space at the device.

8. A method, comprising:
identifying a data link down condition of a link between an Input/Output(I/O) controller port of an I/O controller and a device port of a device;
flushing receive buffers associated with the Input/Output (I/O) controller port in response to the data link down condition;
discarding downstream transactions received at transmit buffers associated with the I/O controller port in response to the data link down condition, the downstream transactions intended to be sent to the device over the link;
flushing the transmit buffers in response to the data link down condition; and
sending synthesized upstream completions to requesters coupled to the I/O controller, the synthesized upstream completions generated by the I/O controller in response to downstream non-posted requests for the device received at the I/O controller port from the requesters that cannot be completed due to the data link down condition.

9. The method of claim 8 wherein discarding the downstream transactions includes discarding all expected downstream completions, wherein expected downstream completions include completions that correspond to upstream non-posted requests received at the I/O controller port from the device port before the data link down condition occurred.

10. The method of claim 9, further comprising:
tracking upstream non-posted requests received from the device port in an outstanding upstream non-posted request queue; and
analyzing the outstanding upstream non-posted requests queue to realize when all expected downstream completions have been received at the transmit buffers associated with the I/O controller port.

11. The method of claim 8 wherein each synthesized upstream completion includes an error indicia to prevent the requester from using the synthesized upstream completion.

12. The method of claim 8, further comprising resetting credit registers associated with the I/O controller port, wherein the credit registers indicate the availability of space at receive buffers associated with the device port.

13. The method of claim 8 wherein the I/O controller port, the device port, and the link operate substantially in compliance with a Peripheral Component Interconnect (PCI) Express specification.

14. An Input/Output (I/O) controller, comprising:
a physical layer link training and status state machine associated with an I/O controller port of the I/O controller;
a data link layer control state machine associated with the I/O controller port; and
a transaction layer link down handling state machine associated with the I/O controller port, the transaction layer link down handling state machine to support restoring a transaction layer of a link to an initial condition without software intervention after a data link down condition, wherein the link between the I/O controller port of the I/O controller and a device port of a device,
wherein the transaction layer link down handling state machine includes a transaction layer completions state that is entered during the data link down condition, wherein the transaction layer completions state to synthesize and send upstream completions to requesters coupled to the I/O controller, the synthesized upstream completions corresponding to outstanding downstream non-posted requests for the device received at the I/O controller port from the requesters that cannot be completed due to the data link down condition, the synthesized upstream completions to include error indicia to prevent the requesters from using the synthesized upstream completions.

15. The I/O controller of claim 14 wherein the I/O controller port to operate substantially in compliance with a Peripheral Component Interconnect (PCI) Express specification.

16. The I/O controller of claim 14 wherein the transaction layer link down handling state machine includes a transaction layer up state to conduct normal operations of the transaction layer.

17. The I/O controller of claim 14 wherein the transaction layer completions state to flush receive buffers of the I/O controller port and to discard transactions received at transmit buffers of the I/O controller port.

18. The I/O controller of claim 17 wherein to discard transactions includes to discard expected downstream completions received at the transmit buffers of the I/O controller port from completers coupled to the I/O controller, the expected downstream completions corresponding to upstream non-posted requests received from the device before the data link down condition.

19. The I/O controller of claim 18 wherein the transaction layer link down handling state machine includes a transaction layer flush state that is entered when the receive buffers have been flushed and all the expected downstream completions have been discarded.

20. The I/O controller of claim 18 wherein during the transaction layer flush state, the transmit buffers stop receiving new transactions and the transmit buffers are flushed.

21. The I/O controller of claim 20 wherein the transaction layer link down handling state machine includes a transaction layer down state that is entered after the transmit buffers have been flushed, the transaction layer link down state to accept and discard downstream transactions received at the transmit buffers.

22. The I/O controller of claim 21 wherein the transaction layer link down state to send synthesized upstream completions to requesters coupled to the I/O controller, the synthesized upstream completions corresponding to outstanding downstream non-posted requests for the device received at the I/O controller port that cannot be sent to the device due to the data link down condition, the synthesized upstream completions to include error indicia to prevent the requesters from using the synthesized upstream completions.

23. A system, comprising:
a network card having a network card port;
an Input/Output (I/O) controller having an I/O controller port, the I/O controller port coupled to the network card port via a PCI (Peripheral Component Interconnect) Express link, wherein the I/O controller includes:
a transaction layer link down handling state machine to support returning a transaction layer of the PCI Express link to an initial condition after a data link down condition, wherein the transaction layer link down handling state machine to synthesize and send a completion to a requester coupled to the I/O controller, the synthesized completion sent in response to a request for the network card received at the I/O controller port from the requester that cannot be completed due to the data link down condition, the synthesized completion including an error indicia.

24. The system of claim 23 wherein the transaction layer link down handling state machine to flush receive buffers associated with I/O controller port.

25. The system of claim 23 wherein the transaction layer link down handling state machine to flush transmit buffers associated with I/O controller port.

26. The system of claim 23 wherein the transaction layer link down handling state machine to discard expected downstream completions received at the I/O controller port from completers coupled to the I/O controller, the expected downstream completions corresponding to upstream non-posted requests received from the network card by the I/O controller port before the data link down condition.

* * * * *